United States Patent

[11] 3,623,568

| [72] | Inventor | Yoichi Mori |
| | | Yokohama, Japan |
| [21] | Appl. No. | 871,816 |
| [22] | Filed | May 29, 1969 |
| [45] | Patented | Nov. 30, 1971 |
| [73] | Assignee | Nissan Motor Company Limited |
| | | Yokohama, Japan |
| [32] | Priority | May 31, 1968 |
| [33] | | Japan |
| [31] | | 43/37230 |

[54] ELECTROMECHANICAL POWER TRAIN SYSTEM FOR AN AUTOMOTIVE VEHICLE
1 Claim, 30 Drawing Figs.

[52] U.S. Cl. ................................................. 180/65 A,
290/15, 290/16
[51] Int. Cl. ...................................................... B60l 11/14
[50] Field of Search ........................................... 180/65 A;
290/9, 10, 11, 12, 14, 15, 16

[56] References Cited
UNITED STATES PATENTS

| 968,290 | 8/1910 | Thomas ..................... | 290/10 |
| 1,284,664 | 11/1918 | Hamrick .................... | 290/16 |
| 1,410,276 | 3/1922 | Stephenson ................ | 290/16 |
| 1,558,806 | 10/1925 | Hess, Jr. .................... | 290/10 |

*Primary Examiner*—Benjamin Hersh
*Assistant Examiner*—Milton L. Smith
*Attorney*—John Lezdey ABSTRACT: An electromechanical power train system for an automotive vehicle having a driving engine in which an electric generator driven by the engine for generating an electric energy for a battery and an electric drive motor for driving a propeller shaft are incorporated together with an electronic controller for controlling the operation of the constituted devices with speed reduction gear. The engine may be smaller for always operating at full throttle open for preventing the discharge of the detrimental exhausted gas.

Fig. 24
(A) 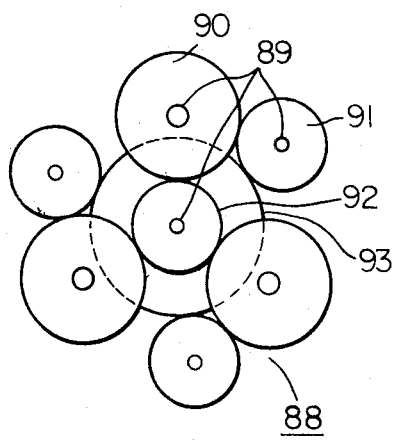
(B) 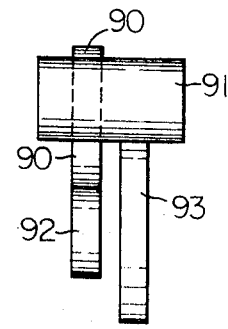
Fig. 25
(A) 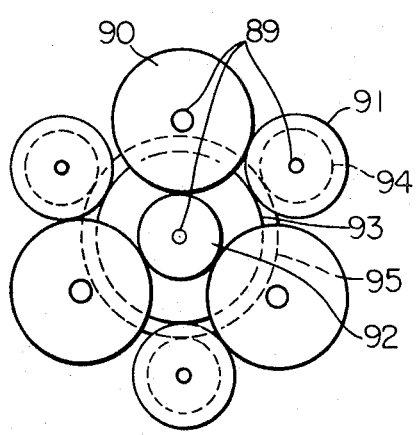
(B) 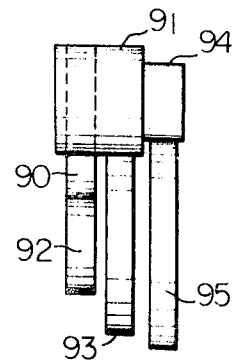

ELECTROMECHANICAL POWER TRAIN SYSTEM FOR AN AUTOMOTIVE VEHICLE

This invention relates to an electromechanical drive system for an automotive vehicle, and more particularly to an electromobile which has mounted therein a mechanical engine with an electric generator for charging and an electric motor for driving the propeller shaft together with the mechanical power from the engine.

In general, the driving system of an electric car as thus far proposed is divided into two categories, one using a battery alone and the other utilizing both the driving engine and generator with a storage battery, the latter being termed a hybrid electromobile. In the hybrid system there are put into practice further two different ways to drive the vehicle, one using the mechanical linkage of the power from the engine through the generator and motor to the propeller shaft and the other using the mechanical and electrical linkage. The mechanical power to be transmitted to the driven shaft from the engine is split into two, one, through the field structure of the generator and the other through the armature or rotor thereof by means of a planetary gear set so that the power of the engine is transmitted partly through the planet gear and ring gear meshed therewith and connected with the field of the generator and partly through the planet gear and sun gear meshed therewith and connected with armature or rotor of the generator.

The loss of the power transmitted through the mechanical linkage such as from the engine through the planetary gear set and generator element to the driven shaft is reduced to a minimum due to its direct linkage while the power generated at the generator driven by the engine to be transmitted electrically as an electric energy to the electric motor in which both the generator and motor have some efficiency lost in operation causes to occur some loss, for example, briefly both of which are approximate 80 percent with the result that total is equal to the product of both efficiencies, that is 64 percent.

Assuming that the capacity of the engine is provided to be smaller such that at normal running the engine is operating at full throttle opening with the result that the pollution of the air by the exhausted gas from the engine due to acceleration or deceleration of the vehicle is eliminated.

In addition, since the armature of the generator is driven by the engine relative to the field thereof the electromotive force or voltage is induced at the field with the result that the torque is induced thereat, which torque is added to the mechanical power mechanically transmitted through the planet and ring gears of the planetary gear set from the engine and field of the generator directly to the driven shaft.

Then in addition to the total power to the driven shaft, the motor torque produced at the electric motor is also transmitted to the driven shaft with the result that the engine may be smaller than the conventional hybrid system in which mechanical transmission of the torque is not added to the motor torque. It follows that the electric or motor torque is used in addition to the engine torque against the travelling resistance so as to drive the vehicle only when starting, ascending and full speed. It means that while the vehicle runs on the level road the electric power is not necessary to utilize resulting that the battery for energizing the motor during operation may be smaller.

More particularly to the aforementioned torque induction at the generator, engine power transmitted through the drive shaft to the carrier of the planetary gear set is divided or split through the planet gears carrying on the carrier partly through the ring gear meshed with the planet gears and connected with the field of the generator and partly through the sun gear meshed with the planet gears and connected with the armature of the generator with the result that the power through the sun gear rotates the armature of the generator to cause the generation of an electric energy and the power through the ring gear and field of the generator is mechanically transmitted directly to the driven shaft such as a propeller shaft to drive through the wheels of the vehicle. On the other hand the voltage is induced due to the revolution of the armature at the field to cause the field to produce motor torque which is added to the mechanical torque transmitted from the engine through the carrier, planet and ring gear and field structure to the driven shaft. In addition the electric energy generated at the generator is applied to the electric motor for driving the driven shaft such as a propeller shaft particularly for starting, ascending or full speed running.

When the vehicle is stopped the sun gear rotates faster than the drive shaft with the result that high electric energy may be generated by the high speed revolution of the armature connected with the sun gear of the planetary gear set so as to make the size of the generator smaller.

Further, it will be possible to make the revolution of the motor high speed by incorporating a speed reduction gear between the motor shaft and the driven shaft to permit the size of the motor to be small. And, it is also understood that with two-speed reduction gear therebetween for low speed of the vehicle the motor may be rotated in high speed enabling the output of the vehicle to be high power particularly for starting, ascending or any other overload. On the other hand for light load such as running on the high way the driven shaft or output shaft of the vehicle may be overdriven by incorporating with particular type of friction-engaging mechanism in the present system.

In order to accomplish the aforementioned performance so as to overcome the unsolved problem for developing the actual electromobile or electric car over the conventional incomplete electric automobile and to offer increased performance of the car of the type, the present invention contemplates to provide a novel and improved electromechanical power train system for an automotive vehicle having a driving engine incorporated with the generator and motor with overdrive device and speed reduction gear so as to automatically operate the movement of the electric car.

The features and advantages of the present invention will become apparent from the following description taken in conjunction with the accompanying drawings, in which:

FIGS. 24a and 24b are schematic sectional and front view of an alternate of the planetary gear set having no ring gear shown by pitch circles;

FIGS. 25a and 25b are views similar to FIGS. 24a and 24b, respectively, but additional sun and planet gears are accommodated;

Figure 1:
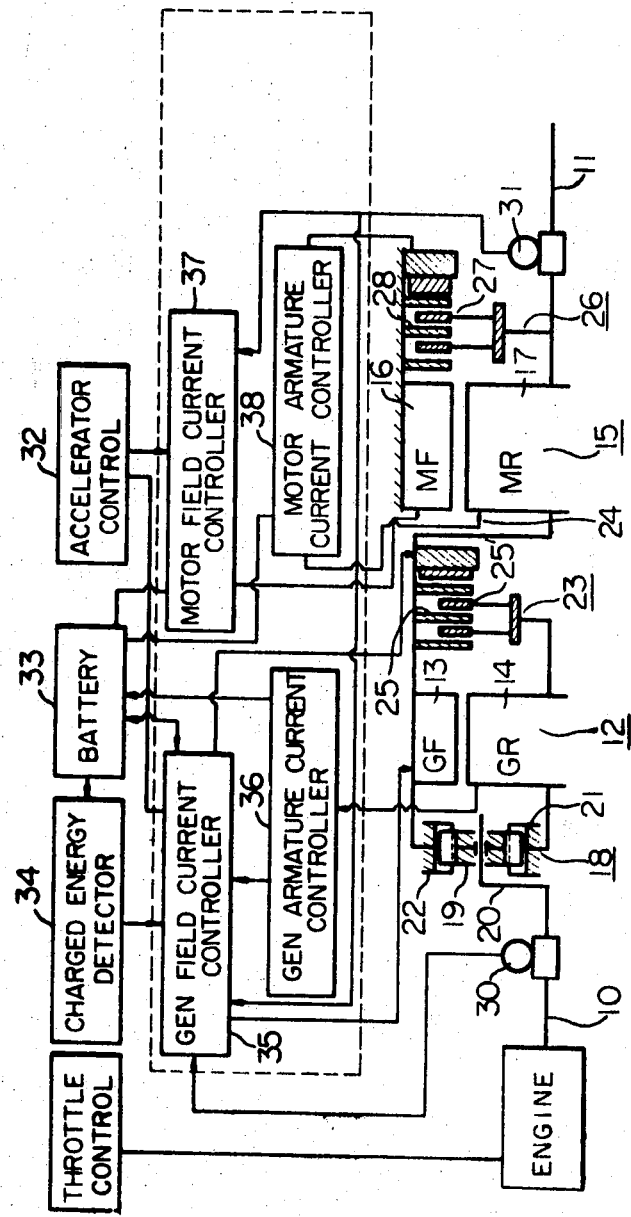
FIG. 1 is a schematic diagram of an electromechanical power train system in accordance with one embodiment of the present invention.

Referring now to FIG. 1, there is shown a schematic diagram of an electromechanical power train system in accordance with one embodiment of the present invention. The electromechanical power train system comprises a drive shaft 10 driven by an automotive engine, a driven shaft 11 such as a propeller shaft for driving wheels, an electric generator 12 which is driven through the drive shaft 10 by the engine and including a field element 13 and armature 14, an electric drive motor 15 for driving through the driven shaft 11 the vehicle and including a field element 16 and armature 17, a planetary gear set 18 engaged between the drive shaft 10 and generator 12 and including a plurality of planet gears 19, a carrier 20 rotatably engaged with said planet gears 19, a sun gear 21 in mesh with said planet gears 19, and a ring gear 22 in mesh with said planet gears 19. The sun gear 21 is connected with said armature 14 of the generator 12, and the ring gear 22 is connected through the field 13 of the generator 12 and armature 17 of the motor 15 with the driven shaft 11. A friction-engaging device or a clutch 23 comprises a first rotary portion 25 connected with an intermediate shaft 24 for connecting the field 13 of the generator 12 and the armature 17 of the motor, and a second rotary portion 25' connected wit the armature 14 of the generator 12. A friction-engaging device or a brake 26 comprises a rotary portion 27 connected with the driven shaft 11, and a stationary portion 28 connected with a body 29 of the vehicle. A first governor or tachometric generator 30 is engaged with the drive shaft 10. A second governor or tachometric generator 31 is engaged wit the driven shaft 11. This system is controlled by an electronic control equipment. The electronic control equipment comprises accelerator control 32 cooperatively connected with a variable resistance (not shown), a battery 33, a charged energy detector 34 for detecting the amount charged in the battery 33 for providing an electric signal in response to the charged amount; a generator controller including a field coil controller 35 for connecting the battery 33 with the field coil and under the control of the charged energy detector 34 for the battery 33, an armature controller 36 for controlling armature current flow from the armature 14 to the battery 33 and vice versa; a motor controller including a field coil controller 37 for controlling field current flow of the motor 15 and an armature coil controller 38 for controlling armature current flow of the motor and under the control of accelerator control 32.

In operation of the aforementioned system, the power Pi transmitted from the vehicle engine through the drive shaft 10 is transferred to the carrier 20 of the planetary gear set 18 so that it is split to one through the sun gear 21 to the armature or rotor 14 of the generator 12 and the other through the ring gear 22 to the field 13 thereof both of which gears are in mesh with the planet gears 19 rotatably supported on the carrier 20. When the engine rotates to drive the drive shaft 10, a carrier 20 connected with the drive shaft 10 therethrough is driven by the engine so that the sun gear 21 driven by the planet gears 19 drives to rotate the armature 14 of the generator 12 and the ring gear 22 driven by the planet gear 19 drives to rotate the field 13 thereof. Thus the field 13 of the generator 12 rotates through the intermediate shaft 24 the armature 17 of the motor 15, so that the latter rotates the driven shaft 11 such as a propeller shaft of the vehicle. Here, the field coil controller 35 of the generator 12 controls the electric current flow through the field coil thereof so as to maintain always the slip between the field 13 and armature 14 of the generator 12 constant in order to generate a predetermined potential of its voltage generated to flow constant current to the battery 33 upon receipt of the voltages generated at the tachometric generators 30 and 31 connected with the drive and driven shafts 10 and 11, respectively. The accelerator control 32 is driven by an operator so as to control the drive of the driven shaft 11 such as propeller shaft in response to the output from the tachometric generator 31 engaged with the driven shaft 11 to cause the torque of the latter to be as required. If the operator presses the accelerator control or foot pedal, it provides more current to flow through the field 16 of the motor 15 so that it accelerates to drive the driven shaft 11 to increase the drive torque produced at the motor 15. Conversely, when he releases the pedal, it provides less current to flow therethrough so that it decelerates the vehicle speed or similarly to the action of the engine braking the motor 15 is driven by the driven shaft 11 so as to generate current flow to brake the vehicle to effect the braking action. The clutch 23 is engaged under the control of the field coil controller when detected thereby of no difference of the relative rotation between the field 13 and armature 14 of the generator 12 such as for direct coupling between the engine and driven shaft in order to prevent loss of power thereat. The brake 26 is engaged for parking to be engaged to the driven shaft 11 with the body 24 of the vehicle.

One example of operational condition of the present system is shown in the following table.

| Operating conditions | Revolution of engine (r.p.m.) | Governor signal | Generator Revolution (r.p.m.) | Charging signal | Battery | Signal of charging amount |
|---|---|---|---|---|---|---|
| Idling | 2,000 | Maintaining the difference of rotation between field and rotor for generating electric energy. | 6,000 | Charging | Charging | Charging |
| Intermediate speed | 4,000 | | 8,000 | | | |
| High speed | 6,000 | | 10,000 | | | |
| Maximum speed | 6,000 | | 6,000 | Direct coupling | Discharging | |
| Non-generating | 4,000 | | 4,000 | do | do | |

| Operating Conditions | Motor | | Output shaft governor signal to— | | Accelerator pedal signal to— | | Remarks |
|---|---|---|---|---|---|---|---|
| | Revolution (r.p.m.) | Operation | Generator | Motor | Generator | Motor | |
| Idling | 0 | Stop | | | | | |
| Intermediate speed | 2,000 | Operating | | | | | |
| High speed | 4,000 | Operating | | Maintaining speed. | | Speed indication. | |
| Maximum speed | 6,000 | Operating | Direct coupling indication. | | | | |
| Non-generating | 4,000 | Generating | | | Direct coupling indication | | Direct coupling, clutch coupled. Do. |

Here, $Tr/Tg = r$,
$Tr + Tg = Ti$, where $Tr$ indicates the torque of the ring gear, $Tg$ indicates the torque of the rotor of the generator, and $Ti$ shows the torque of the input shaft of this system from the engine, from these equations, the following relationship will be led.

$$Tr = r/r+1 \; Ti$$
$$Tg = 1/r+1 \; Ti$$

At the field 13 of the generator 12 is induced the torque $Tg$ from the armature 14 thereof due to the inducing action of the electric motor of the relative motion between the field 13 and armature 14, the former driven through the ring gear 22 connected through the carrier 20 by the drive shaft 10 and the latter driven through the sun gear connected through the carrier 20 by the driven shaft 10 with the result that at the intermediate shaft 24 there is produced in addition to the torque $Tr$ transmitted through the ring gear 22 of the planetary gear set 18 and field 13 of the generator 12 from the drive shaft 10 the torque $Tg$ thus the sum of the torque $Tr$ and $Tg$ equal to $Ti$ being produced at the intermediate shaft 24. More particularly, the input power $Pi$ which is the product of the input r.p.m. $Ni$ times input torque $Ti$ from the engine on the drive shaft 10 is split at the planetary gear set 18 into one $NoTr$ (where $No$ indicates the speed of the output shaft) through the ring gear 22 to the field 13 of the generator 15 and the other $NsTg$ ($Ns$ indicates the speed of the sungear) through the sun gear 21 which is contributed to the generation of electric energy at the generator 12. The power transmitted to the field 13 of the generator 12 is transferred through the intermediate shaft 24 and the armature 17 of the motor 15 to the driven shaft 11. The power transmitted to the armature 14 of the generator 12 is attributed partly to the generation of the electric energy for $NgTg$ (where $Ng$ indicates the difference of the speed between the armature and field of the generator) and partly of the rest, that is $(Ns-Ng) \; Tg = NoTg$ to mechanical transmission transferred to the intermediate shaft 24 to which the power $NoTr$ is transmitted through the ring gear 22 with the result that the power $NoTi$ of the addition of both are transmitted thereto, which power is designated by the curve $a-b-c$ in FIGS. 3 and 4.

It will now be described hereinafter more particularly to the operation of the present system.

It is assumed that the respective revolution per minute of the carrier 20, ring gear 22, and sun gear 21 in the planetary gear set 18 are designated by $Ni$, $No$ and $Ns$, respectively, the relationship among them will be expressed in the following equation:

$$(r+1) \; Ni = rNo + Ns$$

where $r$ shows the ratio of number of teeth of the ring gear 22 to that of the sun gears 21.

Figure 2:
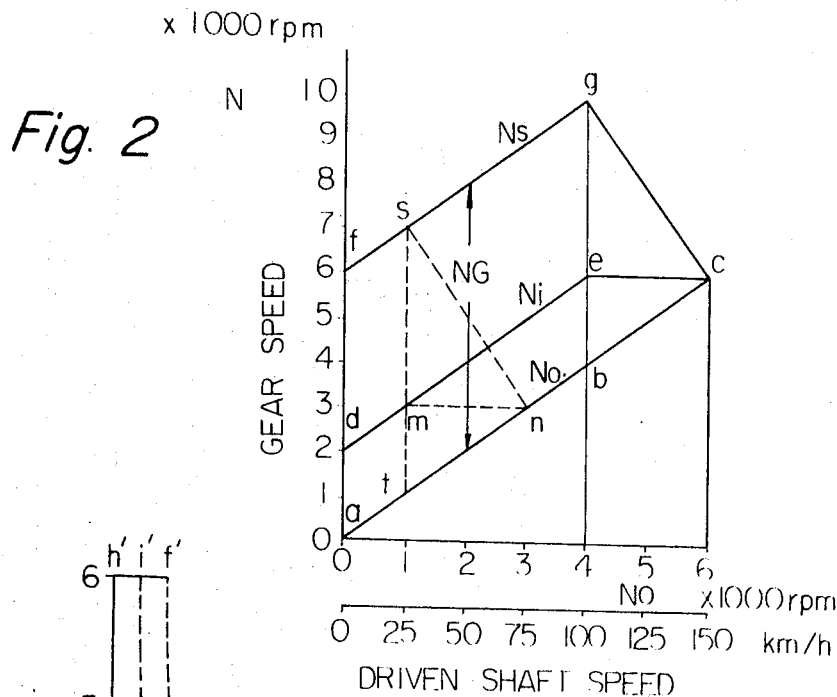
FIG. 2 is a graphical representation of the relationship between the rotation of a ring gear, and that of a carrier and a sun gear of a planetary gear set in various speed of the driven shaft.

Referring now to FIG. 2, which shows a graph of the relationship of the rotation between the ring gear 22 and, carrier 20 and sun gear 21, respectively. In FIG. 2, curve designated by $a$ to $b$ illustrates the case that the rotating difference $Ng$ between the field 13 designated by $No$ and armature 14 denoted by $Ns$ of the generator 12, that is, $Ng$ is equal to the subtraction of $No$ from $Ns$, is sustained at 6,000 r.p.m. and $r$ set at 2.0, whereupon the revolution of the armature 14 connected with the sun gear 21 of the planetary gear set 18 is designated by the curve $f$ to $g$ while that of the carrier 20 is illustrated by the curve $d$ to $e$. Since at the point $e$ the revolution of the engine reaches its maximum speed, in order to maintain the rotation there constant thereat in the still higher speed range, the revolution of the armature 14 of the generator 12 must be slow down in line with the curve $g$ to $c$ with the result that the rotation of the carrier 20 is kept constant along the curve $e$ to $c$ in FIG. 2.

Figure 3:
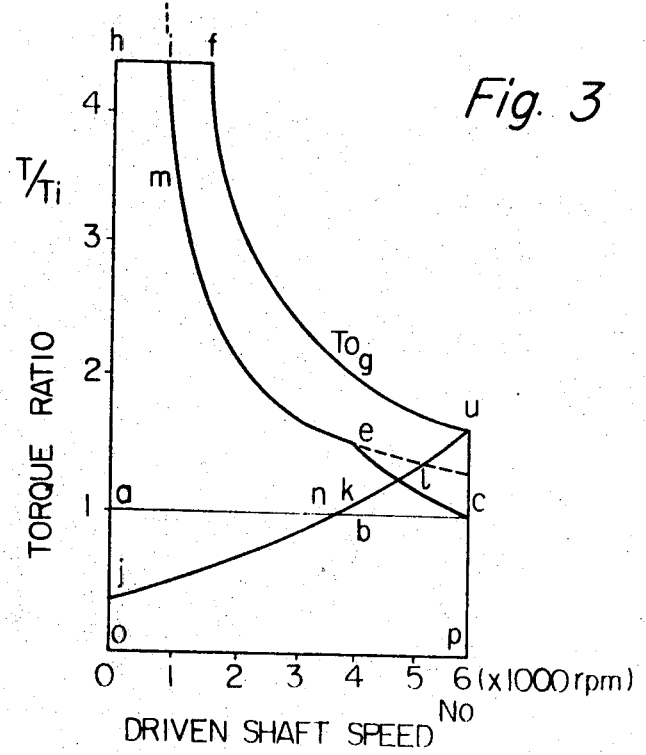
FIG. 3 is a graph of the relationship between the revolution per minute of the driven shaft and torque ratio of the element in this system.

Referring now to FIG. 3, which shows graph of the relationship between the revolution per minute $No$ of the ring gear 22 connected with the field 13 of the generator 12 in abscissa and torque ration in ordinate between the respective torques T and engine torque $Ti$, the engine torque $Ti$ transmitted to the drive shaft 10 is split as previously described one through the ring gear 22 to the field 13 of the generator 12 as designated by $Tr$ and the other through the sun gear 21 to the armature 14 thereof as denoted by $Tg$. Motor torque $Tm$ produced at the motor 15 is illustrated by the area drawn by $a-h-f-u-c$ in FIG. 3. It follows that the total torque applied to the intermediate shaft 24 is the sum of the powers $Ti$ and $Tm$ as illustrated by the area drawn by $o-h-f-u-p$ in FIG. 3. The torque corresponding to the generation of an electric energy is illustrated by the area drawn by $a-h-i-c$. In other respect, the curve $i-e-c$ designates the balance line between the charge and discharge of the storage power supply so that when the travelling resistance of the vehicle on the road is below this curve the storage supply is charged while when it is above this curve the latter is discharged for the motor 15.

It is assumed that the travelling resistance of the vehicle on the level is shown by the curve $j-k-u$ in FIG. 3. When the output speed $No$ of the vehicle is within the range between the curve designated from $j$ to $k$, the vehicle may be driven merely by the engine. During the curve $k$ to $l$ it may be driven by the generated power in addition to the engine. In the range designated by the curve $l-u$ the storage supply discharges, but this is over 120 kilometers per hour which is unusual speed. Since these discharging area is particular case such as high speed, ascending, acceleration, which is relatively short in time while the charging time is longer so that this charging must be restricted. For this purpose, the engine speed may be controlled in response to the charged state of the storage supply 33 such that when the vehicle arrives at the point $m$ in FIG. 2 the engine may be controlled so as to be driven along the line $-n$, whereupon the armature speed of the generator 12 may be controlled in line with curve $s-h$. For the purpose of simplification of the controller the armature speed of the generator 12 may be controlled to rotate along the line $s-t$, whereupon the clutch 22 may be controlled to rotate along the line $s-t$, whereupon the clutch 23 is engaged in which case the maximum engine speed is limited to the line $e-b$ while the armature speed of the generator 21 to the line $g-b$. The clutch 23 is preferably controlled electromagnetically.

Figure 4:
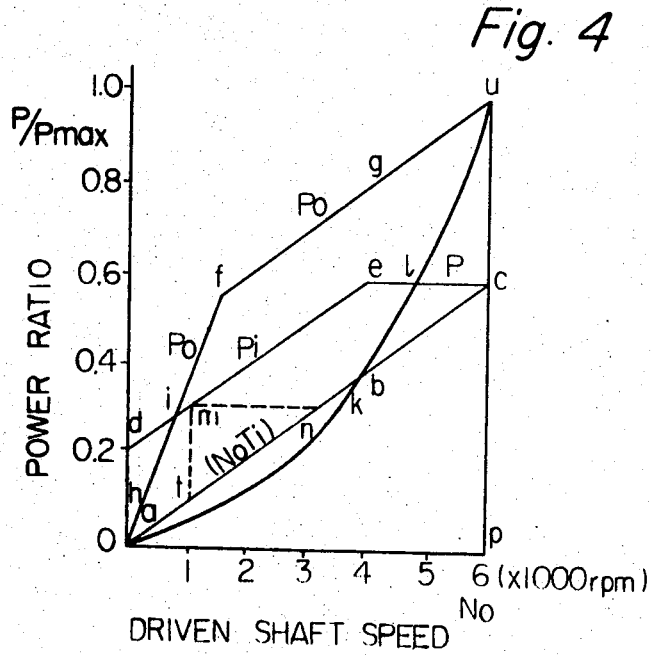
FIG. 4 is a graph showing the relationship between the revolution of the driven shaft and power ratio derived by the product of the value in FIG. 2 and that in FIG. 3.

Referring now to FIG. 4, which shows a graph of the relationship between the revolution $No$ and power ratio derived by adding mathematically the values designated in FIGS. 2 and 3 thereof, the aforementioned mechanical power $NoTi$ transmitted to the intermediate shaft 24 is shown by the curve $a-b-c$. The motor power is designated by the curve $a-f-g-u$ above the previous curve $a-b-c$. Assuming that the power split at the planetary gear set 18 is not accommodated with this system, both the motor 15 and engine require to have the power as designated by the curve $a-f-g-u$. The energy converted to the electric power is illustrated by the curve $h-d-c$ from which the power consumed at the motor 15 is designated by the curve $h-i-e-c$. The curve $i-e-c$ illustrates the balance line between the charge and discharge similarly to the curve $i-e-c$ in FIG. 3.

In the present system since the engine is operated in full capacity without any closure of the throttle valve, the engine-braking action cannot be utilized but an electric braking action may be used by providing the generating action in the motor 12.

It is understood from FIG. 4 that in low speed range, even mechanical power is over the travelling resistance so that in order to control the speed thereof the electric braking may be necessary therefore.

In low speed range the motor 15 may drive the vehicle without using the engine. In case that the starter motor in the engine is defected nor is incorporated, motor starting may be operated thereafter current being flown through the generator so as to start the engine by engaging the clutch 23.

Inasmuch as the motor may run the vehicle in reverse direction the gear for reverse is not required.

In order to stop the vehicle both a foot brake and electric braking action are incorporated to be used with the result that the skik due to high speed of the vehicle may be prevented because the motor-braking action is incorporated with the speed of the output shaft.

In order to prevent a creep during stoppage with the engine idling the parking brake 26 is provided so as to stop always the creep during stopping such that it is mechanically engaged at all times except starting and running automatically released its engagement.

From the foregoing description of the first embodiment of the present invention the following features and advantages are provided:

1. due to its power split type its loss is small and efficiency is preferable. 2. Because of no speed shifting there is no shifting shock. 3. Part power is supplied to the electric system motor and generator may be smaller than that of the conventional hybrid motor car. 4. Larger drive power may be obtained by relatively smaller engine. 5. A suitable battery provides pure electric drive for short time. 6. Even low speed the throttle valve is not closed with the result that it does not pollute the air with the exhausted gas from the engine. 7. The electric braking provides some energy recovery and skid prevention. 8. Normal engine speed may be controlled in response to the state of the storage supply thereby regulating the charging of the supply.

Referring now to FIGS. 5 through 8, which show another embodiments in accordance with the present invention in which the same parts are designated by similar characters to those in FIG. 1.

Figure 5:
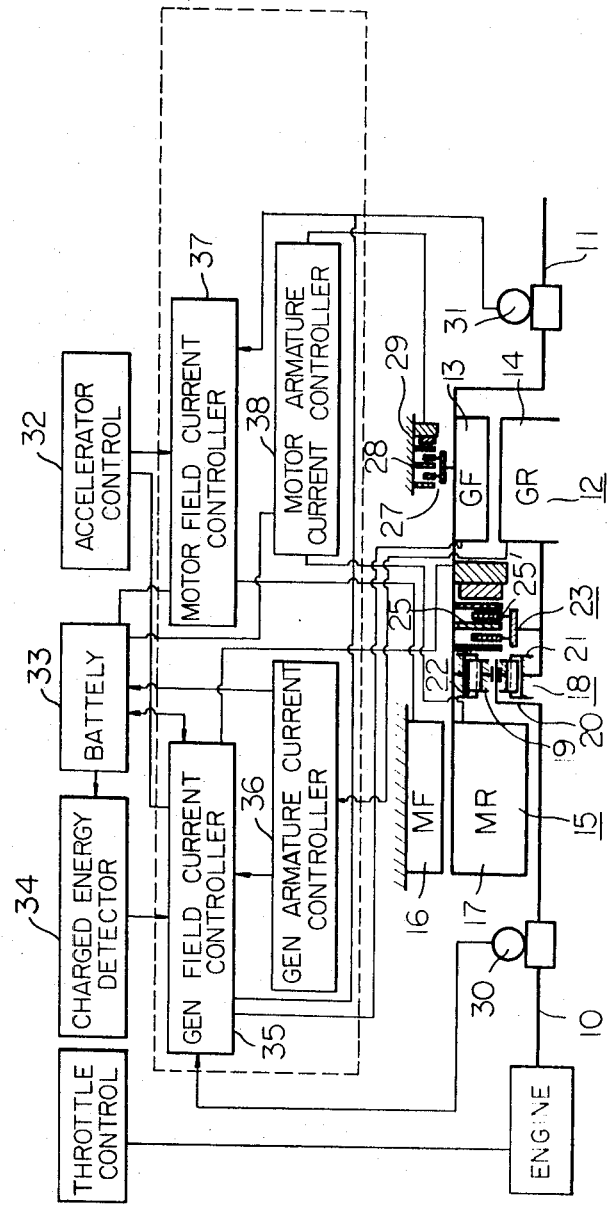
FIG. 5 is a schematically diagrammatical view of another embodiment of the system according to the present invention.

Referring particularly to FIG. 5, the electric motor 15 is disposed between the engine and planetary gear set 18, and the electric generator 12 disposed between the clutch 23 and the driven shaft 11, but the connections between the components are entirely the same as those in FIG. 1, that is the operation thereof is also the same as those.

From this embodiment, larger motor may be conveniently disposed adjacent to the engine so that the arrangement of the devices in the vehicle is good for transportation.

Figure 6:
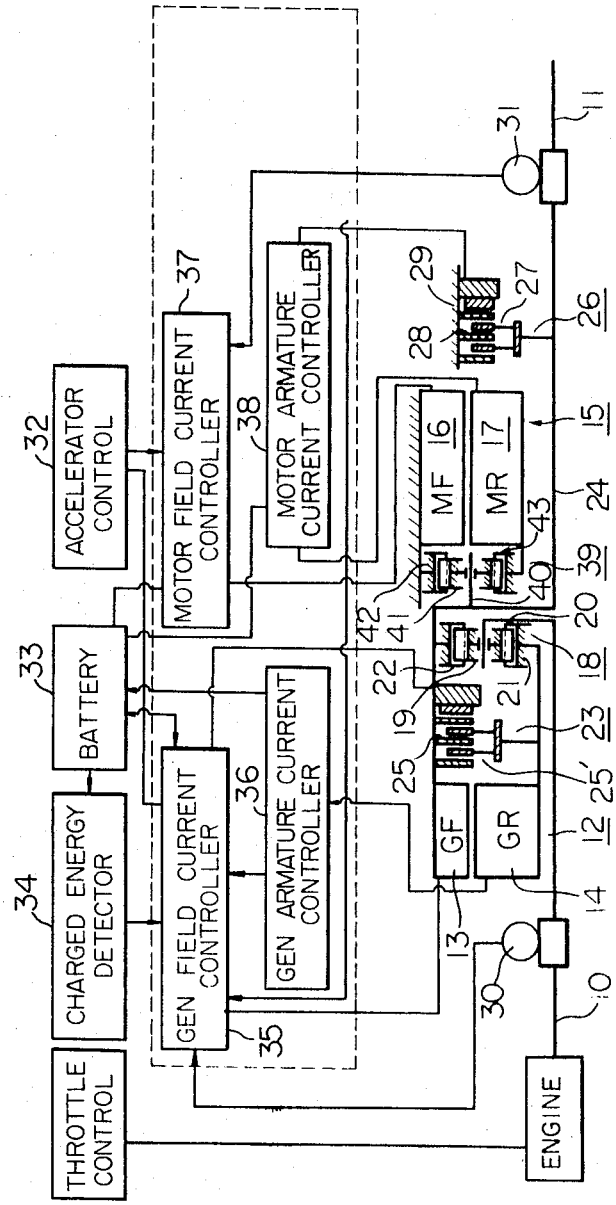
FIG. 6 is a diagrammatic view of this system embodying the present invention in which the generator is disposed in the neighborhood of the engine with another planetary gear set.

Referring now to FIG. 6, the generator 12 is disposed between the engine and the clutch 23 thereafter the planetary gear set 18 being located. This system further comprises a second planetary gear set 39 including a second carrier 40 connected with the driven shaft 11, a plurality of second planet gear 41 rotatably carried on the carrier 40, a second ring gear 42 engaged in mesh with the planet gears 41 and also connected with a body of the vehicle, and a second sun gear 43 engaged in mesh with the planet gears 41 and also connected with the armature 17 of the motor 15.

It is understood from the foregoing description that since the generator is adjacent to the engine its brush is convenient to replace and further the generator and motor may be separated to be connected through a shaft such as a propeller shaft.

It is assumed that the gear ratio between the sun and ring gears of the first and second planetary gears 18 and 39 are 3 and 2, respectively, in idling of the engine which is rotating at 2,500 r.p.m., the armature or rotor 14 of the generator 12 rotates at 10,000 r.p.m. with the driven shaft 11 connected with the ring gear 22 of the first planetary gear set 18 being stationary.

In intermediate speed range, when the engine rotates at 5,000 r.p.m., the rotor 14 of the generator 12 rotates at 12,500 r.p.m. and the driven shaft connected with the ring gear 22 of the first planetary gear set 18 rotates at 2,500 r.p.m. together with the second carrier 40 of the second planetary gear set 39, whereupon the armature or rotor 17 of the motor 15 rotates at 7,500 r.p.m.

In high speed range, while the engine rotates at 5,000 r.p.m., since the second ring gear 42 is fixedly secured to the body 29 of the vehicle the rotor 17 of the motor 15 rotates at 15,000 r.p.m.

Figure 7:
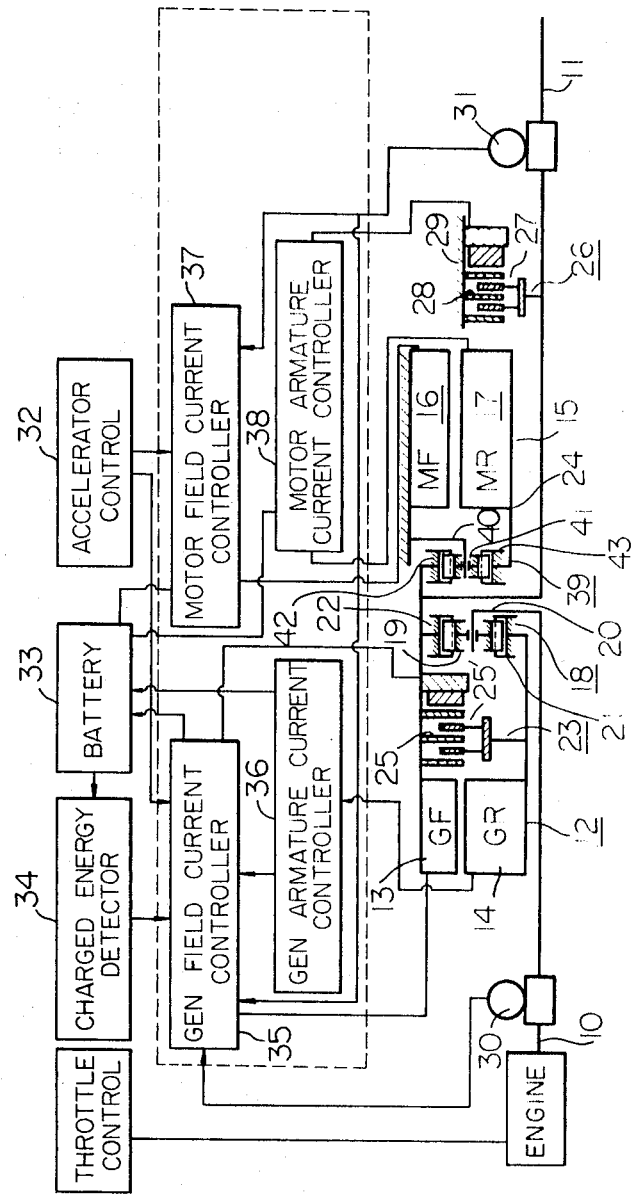
FIG. 7 is a schematic view of this system according to further embodiment of this invention in which second carrier of the second planetary gear set is connected with the body of the vehicle.
Figure 8:
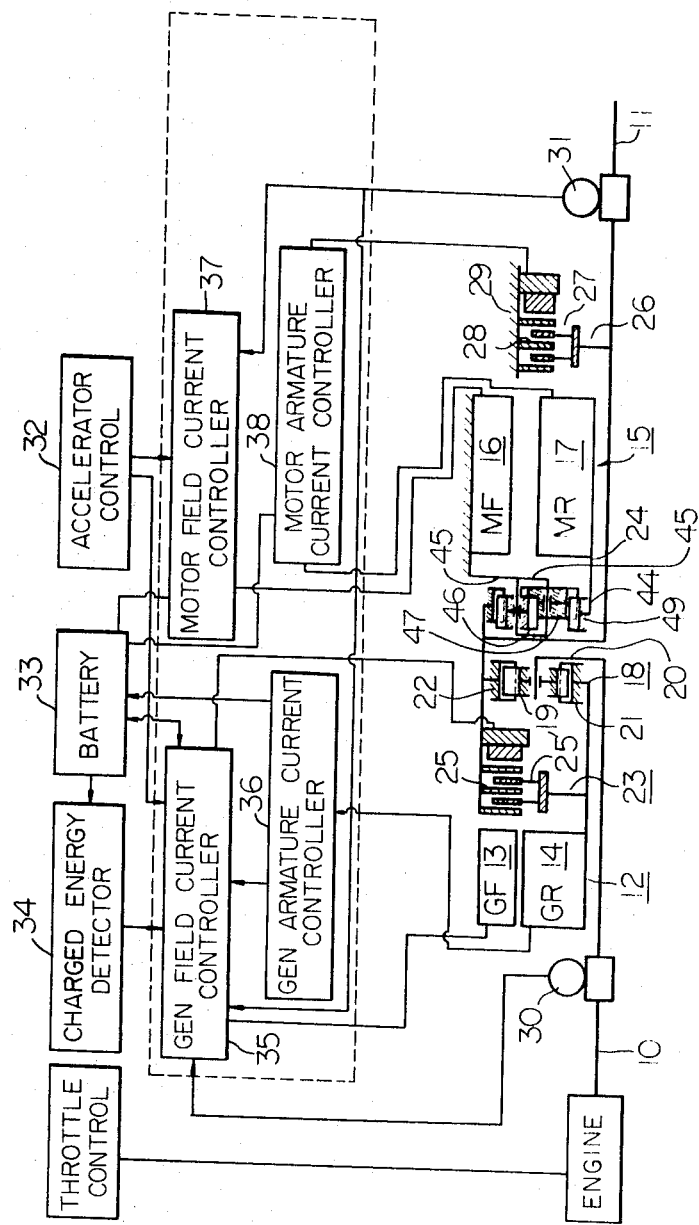
FIG. 8 is a diagrammatic view of this system in which a double planet planetary gear set is incorporated therein accordance with the embodiment of the present invention.

Referring now to FIG. 7, which shows a system of further embodiment of the present invention as an alternate of that shown in FIG. 6, the second carrier 40 is connected with the body of the vehicle, the second planet gears 41 carried on the second carrier 40, the second ring gear 42 engaged in mesh with the planet gears 41 and also connected with the driven shaft 11, and the second sun gear 43 meshed with the planet gears 42 and also connected with the armature 17 of the motor 15.

It will be clear from the aforementioned description that though the motor 15 rotates in reverse direction the speed reduction ratio of the motor may be smaller than the previous embodiment.

Referring now to FIG. 7, which shows another alternate similar to the alternate shown in FIG. 7 of the system shown in FIG. 6, instead of the second planetary gear set 39, a double planet planetary gear set 44 is incorporated with this system. The double planet planetary gear set 44 includes a plurality of two pairs of planet gears 46, 47 meshing each other and carried on carriers 45' and 45'', respectively, which are connected integrally with each other to the carrier 45 connected with the body 29 of the vehicle, a ring gear 48 engaged in mesh with the planet gear 46 and also connected with the driven shaft 11, and a sun gear 49 meshed with the planet gear 47 and also connected with the armature 17 of the motor 15.

It is clearly understood that the motor rotates in the normal direction together with the speed reduction ratio being small.

If the gear ratios $r1$ and $r2$ between the sun and ring gears corresponding to the first and second planet gears are equal to 3 and 2.5, respectively, the armature or rotor 14 of the generator 12 rotates 10,000 r.p.m. when idling with the engine rotating at 2,500 r.p.m. and with the vehicle stationary.

In intermediate speed range, when engine rotates at 5,000 r.p.m., the rotor 14 of the generator 12 rotates at 12,000 r.p.m., whereupon the driven shaft connected with both the ring gears 22 and 48 rotates at 2,500 r.p.m. It follows that since the carrier 45 is fixedly secured to the body 29 of the vehicle the armature or rotor 17 of the motor 15 rotates at 6,250 r.p.m.

In high speed range, while the engine rotates at 5,000 r.p.m. the rotor 14 of the generator 12 and driven shaft connected with the ring gears 22, 48 rotates at the same speed as the rotor 14, whereupon the rotor 17 of the motor 15 rotates at 12,500 r.p.m.

In order to increase the power of the driven shaft for starting and ascending of the vehicle on the road, there may be provided a two-speed gear reduction at the transmission system in which low speed gear ratio is used for the starting and ascending thereof and high speed ratio for the normal running.

Figure 9:
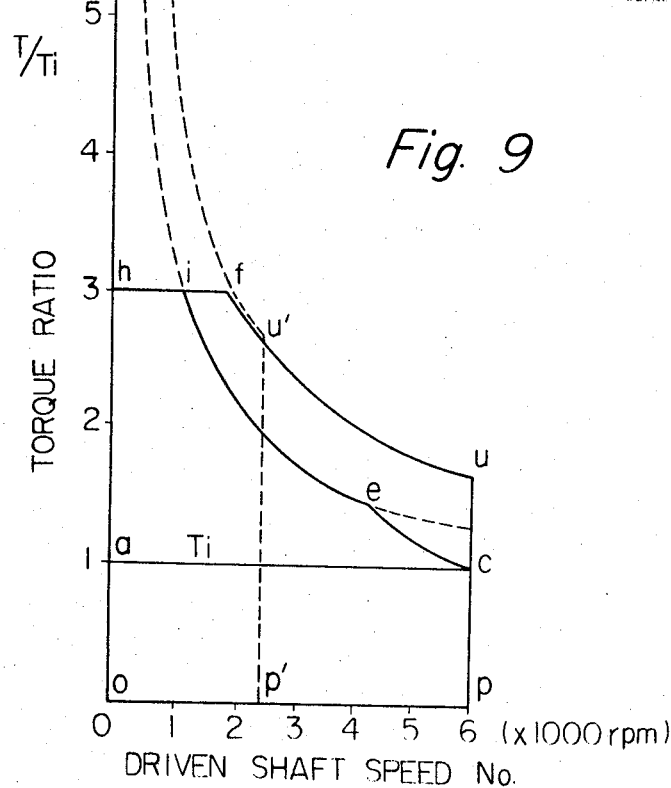
FIG. 9 is a graph of the relationship between the vehicle speed and the torque ratio of the system having a speed reduction gear according to the present invention.

Referring now to FIG. 9, which shows a graph of the relationship between the vehicle speed $No$ and the torque, the area designated by $o-h-f-u-p$ is high speed range and that by $o-h'-f'-u'-p'$ low speed. The torque denoted by $a-h$ is the product of three times that by $c-u$. It is assumed that the speed reduction ratio is 2.5. The torque illustrated by $a-h'$ is the product of 7.5 times that by $c-u$ and the torque $o-h'$ is the product of three times that by $p-u$. If the vehicle speed at $p$ is 150 kilometers per hour, the speed at the point $p'$ is 60 kilometers per hour.

Figure 10:
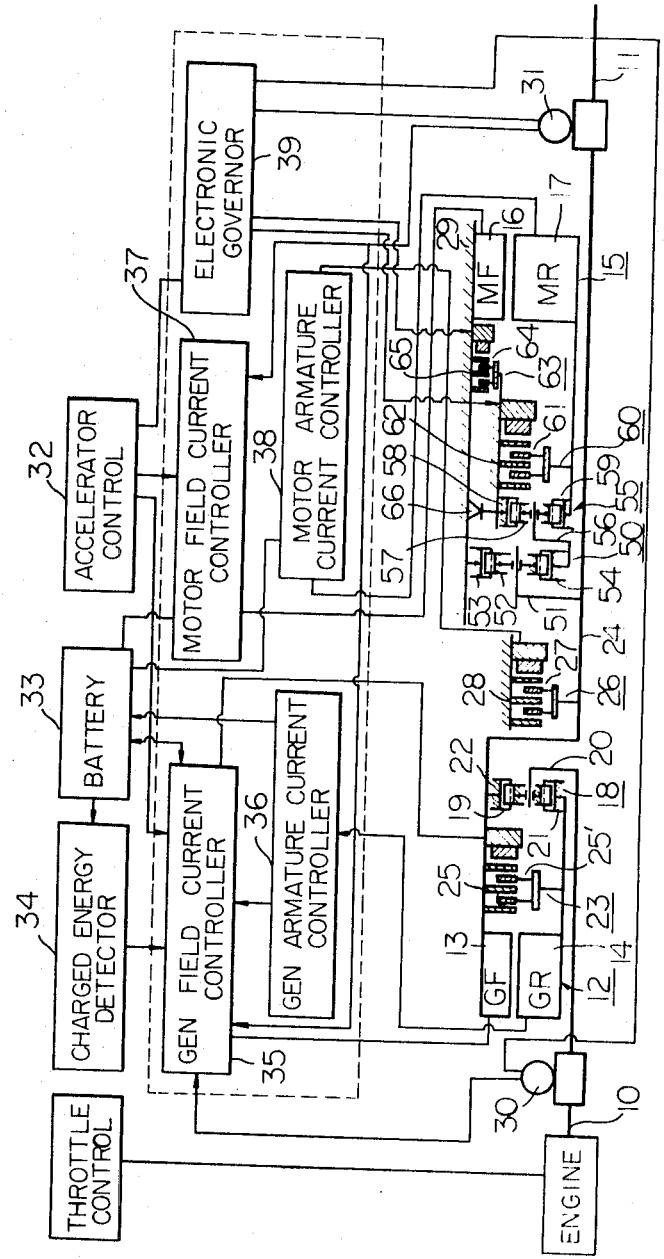
FIG. 10 is a schematic view of a modification according to this invention particularly incorporated with two planetary gear sets for two-speed gear reduction.

Referring now to FIG. 10, which shows a system having two planetary gear set for two-speed gear ratio embodying the present invention, which comprises a second planetary gear set including a second carrier 51 connected to the driven shaft 11, a plurality of second planet gears 52 carried on the carrier 51, a second ring gear 53 meshed with the planet gears 52 and also connected with the body 29 of the vehicle and a second sun gear 54 meshed with the planet gears 52; a third planetary gear set 55 including a third carrier 56 connected with the second sun gear 54 in the second planetary gear 50, a plurality of third planet gears 57 carried on the third carrier 56, a third ring gear 58 engaged in mesh with the planet gears 57, and a third sun gear 59 engaged in mesh with the planet gears 57 and also connected with the armature 17 of the motor 15; a third clutch 60 having a driving portion 61 connected with the third ring gear 59 and armature 17 of the motor 15 and a driven portion 62 connected with the third ring gear 58; a fourth friction-engaging device or a brake 63 having a rotary portion 64 connected with the third ring gear 58 and rotor portion 62 of the third friction-engaging device or clutch and a stationary portion 65 connected with the body 29 of the vehicle.

In operation of the aforementioned planetary gear sets 50 and 55 with clutch 60 and brake 63, for low speed range and reverse operation the third clutch 60 is released and the brake 63 is engaged so that the ring gear 58 of the third planetary gear set 55 is fixed. Then, in low speed, the motor 15 is normally rotated, and in reverse operation it is reversely operated. In high speed range the brake 63 is released and the clutch is engaged. Assuming that the sizes of the second and third planetary gear set is the same and the radii of the pitch circles of both the second and third ring gears 53, 58 of the second and third planetary gear sets 50, 55, respectively are $r$ times those of the second and third sun gears 54, 59, respectively, the respective gear reduction ratios between the driven shaft and the rotor 17 of the motor 15 are:

in low speed $R1=(r+1)^2$
in high speed $R2=(r+1)$
therefore,
$R1/R2=(r+1)$
will be led.
FOr example, assuming that $r$ is equal to 2.0,
$R1=9.0$
$R2=3.0$
$R1/R2=3.0$ Further, the generator 12 and motor 15 are engaged through the intermediate shaft 24 such as a propeller shaft with the result that the generator 12 may be adjacent to the engine so that the motor 15 is separated to be disposed near at the rear wheels so as to balance the weight in the vehicle.

This system may preferably comprises a one-way brake 66 between the ring gear 53 and driven portion 62 of the clutch 60, and body 29 of the vehicle in parallel with the brake 63 so that it allows the third ring gear 53 of the third planetary gear set 50 to rotate in normal direction but prevents it from rotating in reverse direction with the result that even though both the third clutch 60 and brake 63 are not engaged the third planet gears 52 of the third planetary gear set 50 receives reaction to prevent from reverse rotation which is the same action as the fourth clutch 63 is engaged thereby the driven shaft 11 starting to rotate in low speed.

The third clutch 60 and brake 63 are controlled so as to select high or low speed range for normal or starting and ascending operation by an electronic governor 39 controller responsive to the accelerator control and driven shaft speed generated at the governor or tachometric generator connected with the driven shaft in order to control the operation of the generator and motor with the engine.

Figure 11:
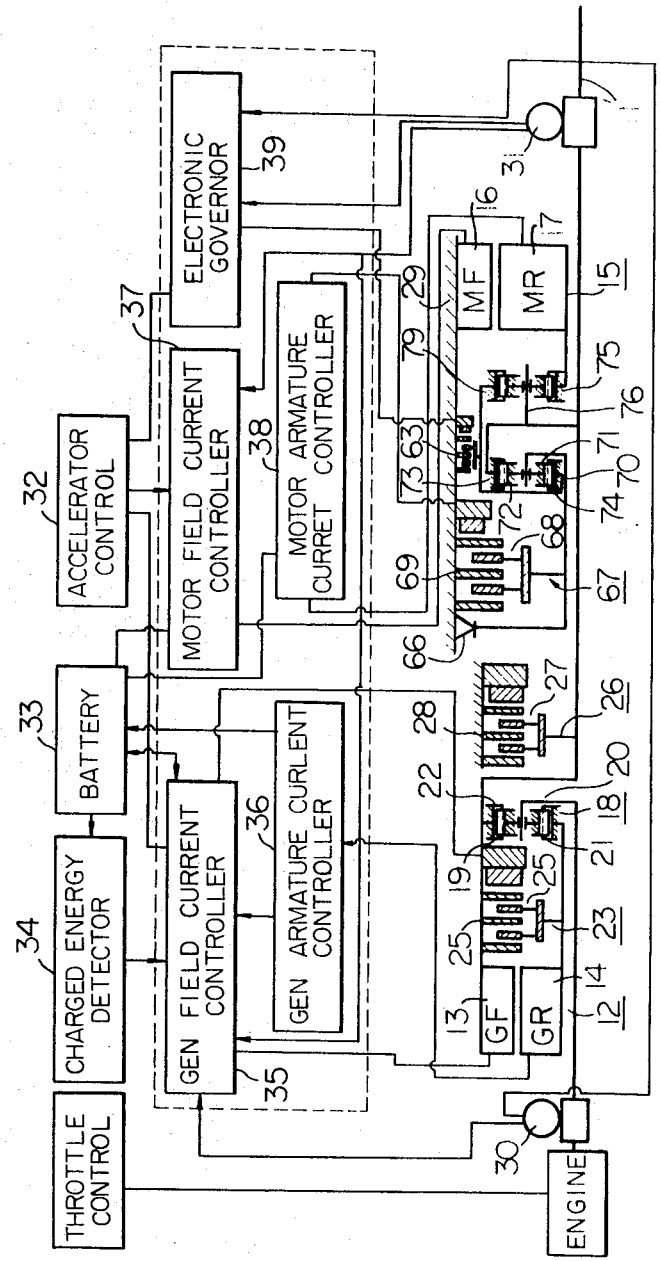
FIG. 11 is a diagrammatic view of an alternate of the system shown in FIG. 10 in which fourth friction-engaging device is disposed between the two planetary gear sets.
Figure 12:
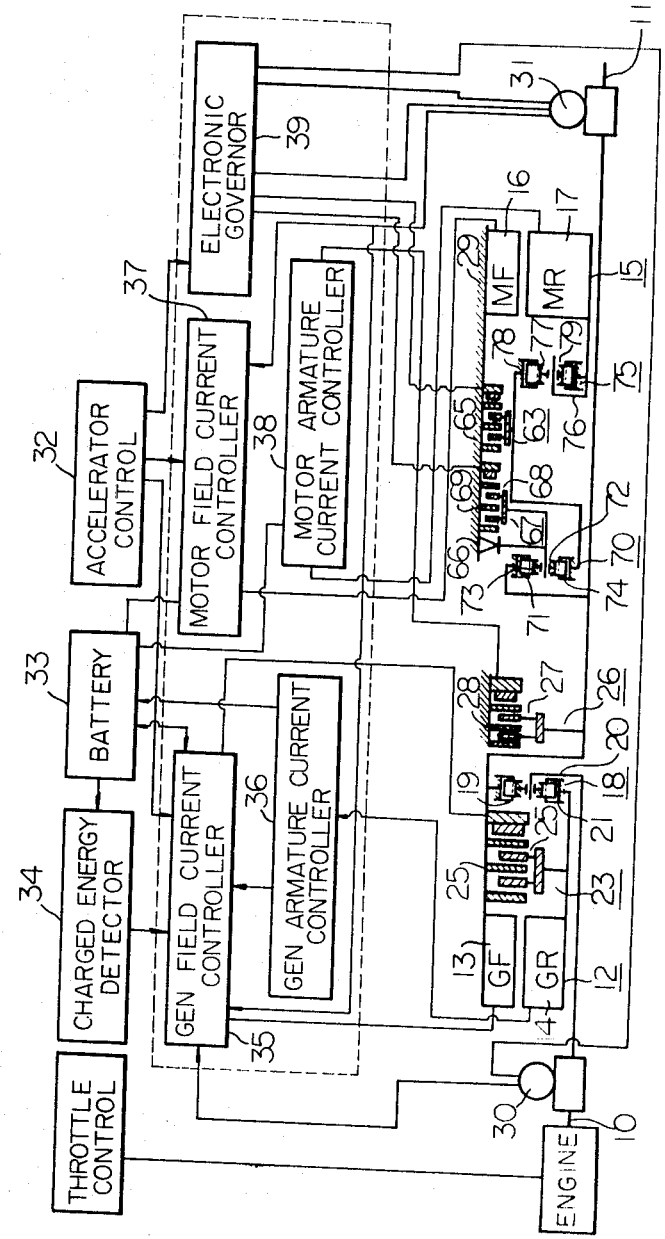
FIG. 12 is a view similar to FIG. 11 but the fourth friction-engaging device is disposed at the front side of the two planetary gear sets.
Figure 13:
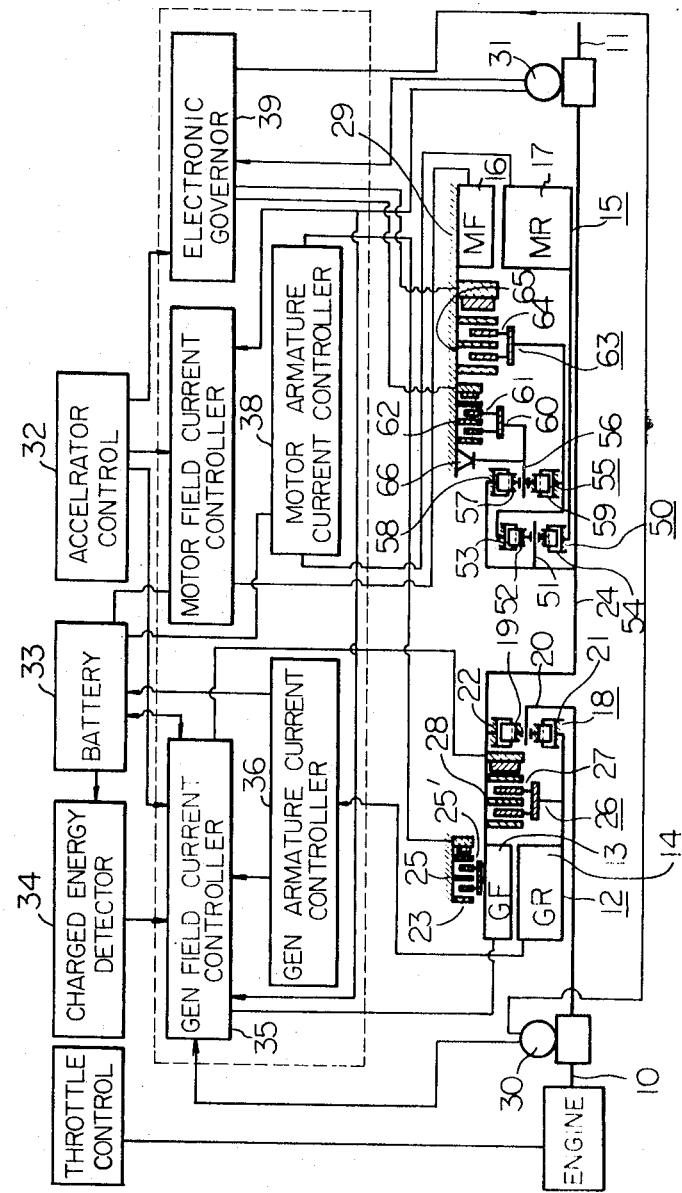
FIG. 13 is a view similar to FIG. 12, but both the third and fourth friction-engaging devices are disposed at the rear side of the two planetary gear sets.

Referring now to FIGS. 11 to 13, which show another alternates of the system having two-speed gear reduction, in all of which embodiments the second ring gear 73 of the second planetary gear set 70 and the third carrier 76 of the third planetary gear set 75 are connected with the driven shaft 11. The second sun gear 74 of the second planetary gear set 70 is connected with the third ring gear 78 of the third planetary gear set and with the brake 67. The second carrier 71 of the second planetary gear set 70 is connected with the brake 63 and the third sun gear 79 of the third planetary gear set 75 is connected with the rotor 17 of the motor 15.

In the system shown in FIG. 11, the brake 63 is disposed at the front side of the two planetary gear sets 70 and 75.

For the system shown in FIG. 12 the brake 63 is disposed between the two planetary gear sets 70 and 75.

In the system illustrated in FIG. 13 both the brakes 63 and 67 are disposed at the rear side of the two planetary gear sets 70 and 75.

It will now be hereinafter described as to the operation of the previous embodiments shown in FIGS. 11 to 13.

In low speed or reverse operation of the vehicle, the brake 67 is released while the brake 63 is engaged so that the second carrier 71 of the second planetary gear set 70 is fixed to the body 29 of the vehicle.

In high speed operation the brake 63 is released while the brake 67 is engaged so that the third ring gear 78 of the third planetary gear set 75 is fixed to the body 29 of the vehicle, whereupon since the second carrier 71 of the second planetary gear set 70 rotates in low speed one-way brake 66 is preferably provided between the rotary portion 65 of the brake 63 and the body 29 in parallel therewith so that it allows the second carrier 71 of the second planetary gear set 70 to rotate in normal direction but prevents it from rotating in reverse direction with the result that even though both the brake 67 and brake 63 are not engaged the second planet gears 72 of the second planetary gear set 70 receives reaction to prevent from reverse rotation which is the same action as the brake 63 is engaged thereby the driven shaft 11 starting to rotate in low speed.

When being transferred to high speed, the transmission system is shifted immediately after the brake 67 is engaged with the result that while shifting a shock due to the shifting is prevented.

Assuming that the gear ratios between the ring and sun gears of the aforementioned second and third planetary gear sets are $r2$ and $r3$ respectively, the respective speed reductions may be:

in low speed $R1=r3(r2+1)+1$
in high speed $R2=r3+1$
therefore,
$R2/R2=(r2r3+r3+1)/(r3+1)$ For example, assume that $r2$ and $r3$ are equal to 2.4, the results are:
$R1=9.16, R2=3.4$ and $R1/R1/R2=2.7$ Referring now to FIGS. 14 through 16, which show a further embodiments of the system in accordance with the present invention but showing the part of rearward from the intermediate shaft 24 in which the motor is disposed at the rearmost of the vehicle and there are provided hypoid gears 80, 81 disposed between the third planetary gear set 75 and motor 15 so as to drive to rotate a rear axle 81' but the drive shaft 10 is omitted. The arrangement of the speed reduction gears and their operations are similar to those shown in FIGS. 11 to 13, but the driven shaft 11 is mounted to the third carrier 76 of the third planetary gear set 75 oppositely against the intermediate or propeller shaft 24 different from the previous embodiments, where the driven shaft 11 is hollow through which a motor shaft 29 is passed for transmitting the motor torque from the motor 15 to the third sun gear 79 of the third planetary gear set 75. The hypoid pinion gear 80 is mounted on the hollow driven shaft 11 which pinion gear 80 transmits the power to the crown gear 81 meshed therewith so as to drive to rotate the rear axle 81'.

Figure 17:
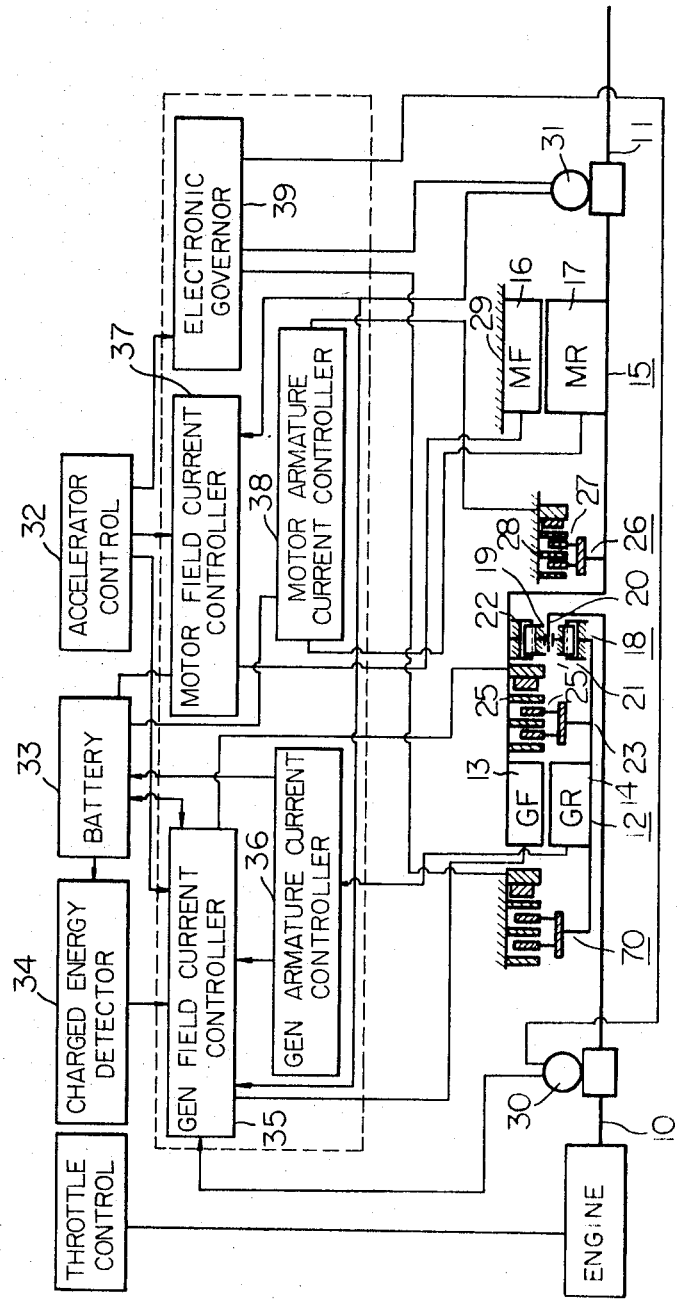
FIG. 17 is a schematic view of the system in accordance with the present invention in which an overdrive is incorporated therewith.

Referring now to FIG. 17, which shows a still another alternate of this system in accordance wit the present invention having smaller engine with an overdrive operation for prevention of over charge of the storage battery and also for balancing the generation of mechanical torque produced by the engine and the travelling resistance of the vehicle on the road.

In this system the generator 12 is disposed at the front of the planetary gear set 18 in comparison with the first embodiment shown in FIG. 1. This system comprises a friction-engaging device of a brake 82 for the overdrive of the engine by the motor 15 in addition to those shown in FIG. 1, said brake comprising a drive portion connected with the armatures of said generating means and a driven portion connected with the body of the vehicle, so that when the brake 82 is engaged to stop the rotor or armature 14 of the generator 12 the driven shaft 11 is overdriven thereby against the engine speed.

Figure 18:
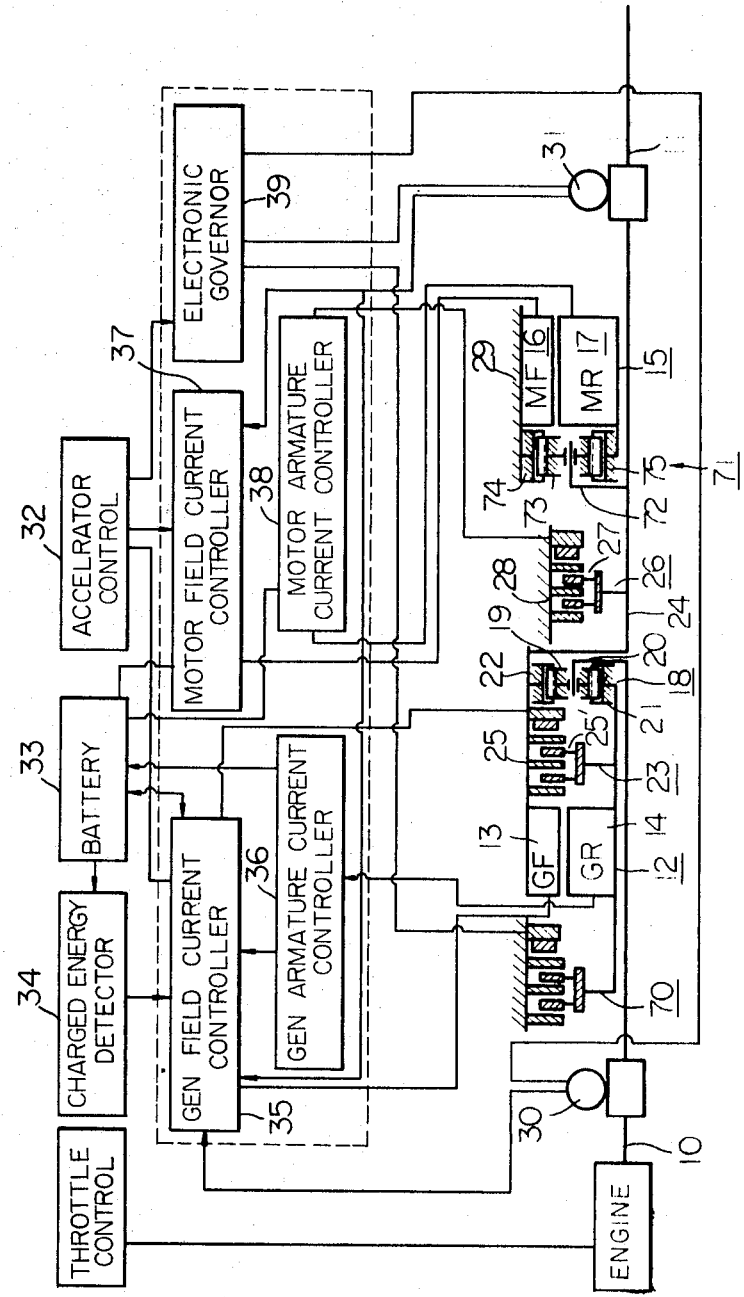
FIG. 18 is a view similar to FIG. 17, but a second planetary gear set is accommodated therewith.

Referring particularly to FIG. 18, which shows another modification of that shown in FIG. 17 which comprises in addition to those shown in FIG. 17 a second planetary gear set 83 including a second carrier 84 connnected with the driven shaft 11, a plurality of planet gears 85 carried on the second carrier 84, a ring gear 86 meshed wit the planet gears 85 and also connected with the body 29 of the vehicle, and a second sun gear 87 engaged in mesh with the planet gears 85 and also connected with the armature 17 of the motor 15.

The planetary gear set 83 provides in operation speed gear reduction from the motor 15 to the driven shaft 11 with the result that the motor 15 may be smaller type with high speed operation thereby.

Figure 19:
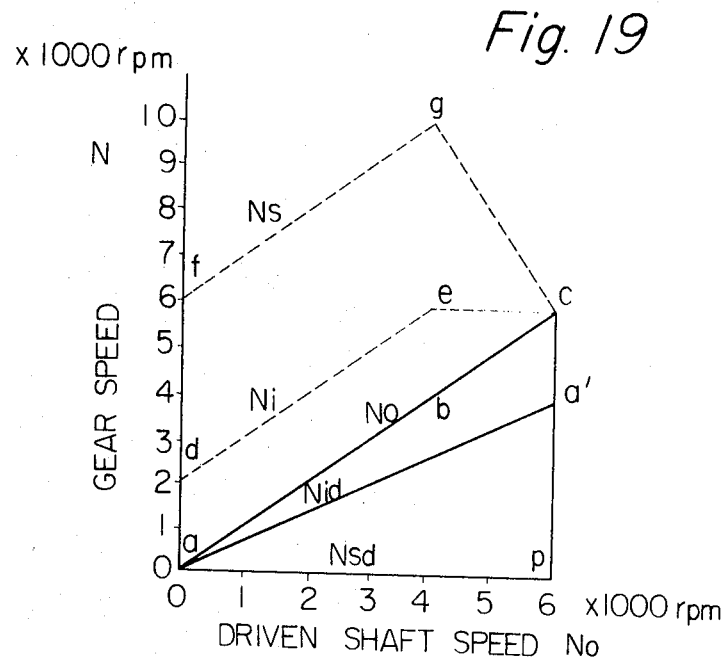
FIG. 19 is a graph of the relationship between the speed of the component gear and that of the driven shaft.
Figure 20:
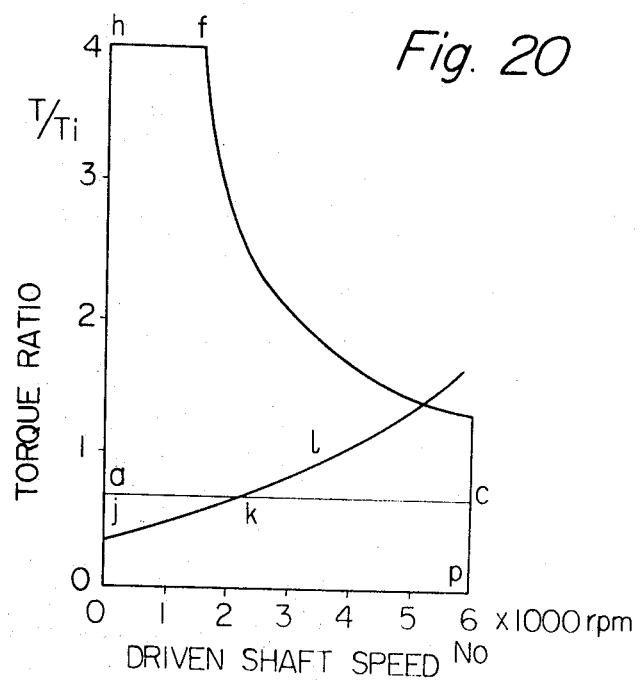
FIG. 20 is a graph of the relationship between the speed of the driven shaft and the torque ratio thereof.

Referring now to FIGS. 19 and 20, which show graph of the relationship between the respective gear speed N and the driven shaft speed $No$, and, of the relationship between the driven shaft speed $No$ and torque ratio $T/Ti$, when the brake 82 is not engaged or in no overdriven condition the speed of the sun gear $Ns$ is denoted by the broken line $f-g$, that of the carrier $Ni$ connected with the driven shaft 11 by the broken line $d-e$, while when the brake 82 is engaged to cause the transmission in overdriven state the sun gear is stopped with the result that the driven shaft 11 is rotated at the speed $Nsd$. Further, the speed of the carrier connected with the driven shaft 11 becomes $Nid$ so that the driven shaft 11 rotates in low speed.

As to the torque relationship therebetween, it is shown in FIG. 3 for the case that the driven shaft 11 is not overdriven thereby, while FIG. 20 shows the case that the driven shaft 11 is overdriven by the engine.

It will be clear from the graphical representation in FIG. 20 that the mechanical torque transmitted by the engine is reduced as shown by the line $a-k-c$ and the motor torque is added thereto in the graph with the result that overall torque of the system is decreased than that of the case shown in FIG. 3, whereupon the generator 12 is not generating an electric energy so that overall area the storage power supply discharges the energy of the motor torque. Assuming that the electric energy is generated at the generator 12, the mechanical torque corresponding to the energy consumed therefore is reduced. In FIG. 20 the travelling resistance of the vehicle on the level road is shown by the curve $j-k-l$ and the crossing point $k$ between the curve $j-k-l$ and mechanical torque line designated by $a-c$ is the balanced point of the mechanical torque produced by the engine and the travelling resistance. As shown in FIG. 20, this balanced point is in he neighborhood of 50 kilometers per hour of the speed, while if the vehicle runs slower than this speed the generator will produce the generation of an electric energy and if it moves faster than this speed motor may be driven such as by the operation of the accelerator control.

Since the engine always rotates slower than the driven shaft in this state steady operation may be provided, and if the speed thereof is further slow down to cause the engine to occur knocking the brake 82 may preferably be released to return to the normal operation.

Figure 21:
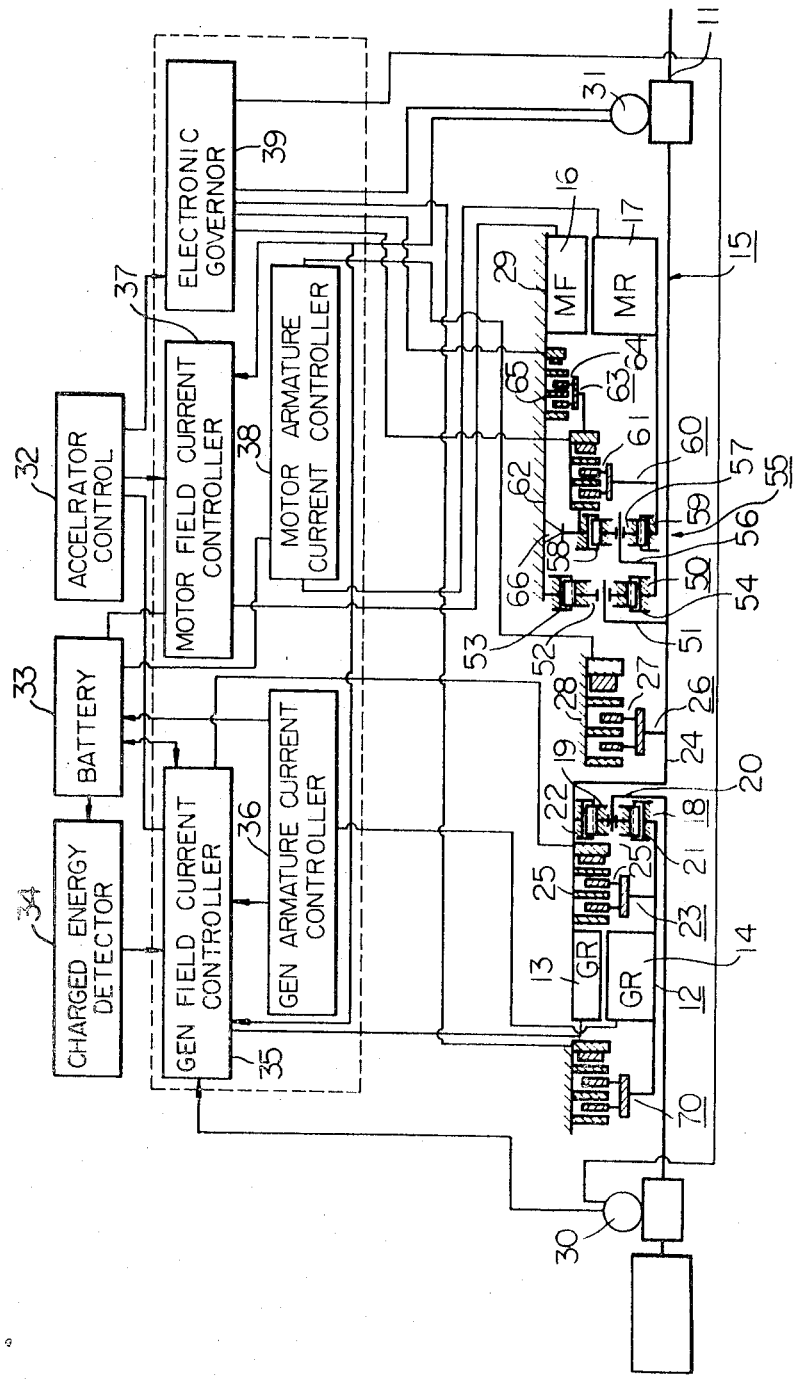
FIG. 21 is a schematic view of an alternate of the present system in which an overdrive is incorporated together with two-speed gear reduction embodying the present invention.

Referring now to FIG. 21, which shows still another alternate of the system according to the present invention having two-speed gear reduction similar to that shown in FIG. 10 at the motor to brake 82 for the overdrive, which system comprises in addition to the constitution in the system shown in FIG. 17 second planetary gear set 50 including a second carrier 51 connected with the driven shaft 11, a plurality of second planet gears 52 carried on the carrier 51, a ring gear 53 meshed with the planet gears 52 and also connected with the body 29 of the vehicle, and a sun gear 54 meshed with the planet gears 52; a third planetary gear set 55 including a third carrier 56 connected with the second sun gear 54, a plurality of third planet gears 57 carried on the third carrier 56, a third ring gear 58 engaged in mesh with the third planet gears 57 and also connected with one-way clutch 66 connected with the body of the vehicle, a third sun gear 59 meshed with the third planet gears 57 and connected with the rotor or armature 17 of the motor 15.

It will be clear that this system may be provided with the two speed gear reduction such as shown in FIGS. 11 to 13.

In operation of the previous system, for low speed range and reverse operation the third clutch 60 is released and the brake 63 is engaged so that the ring gear 58 of the third planetary gear set 55 is fixed. Then in low speed, the motor 15 is normally rotated, and in reverse operation it is reversely operated. In high speed range the brake 63 is released and the brake 82 is engaged. The brake 82 in this system is for the overdrive of the engine by the motor 15 so that when the brake 82 is engaged to stop the rotor or armature 14 of the generator 12 the driven shaft 11 is overdriven thereby against the engine speed. Using this system the low speed range is used for starting the engine and ascending and high speed range is used for normal running on the level land and also overdrive range used for running high way under the automatic control of electronic governor 39 responsive to the accelerator control and driven shaft speed generated at the governor or tachometric generator connected therewith so as to energize the brakes and clutches for high, low and overdrive speeds. Thus, the generator and motor are controlled for all operational conditions with small engine and storage power supply instead of the conventional larger engine.

Figure 14:
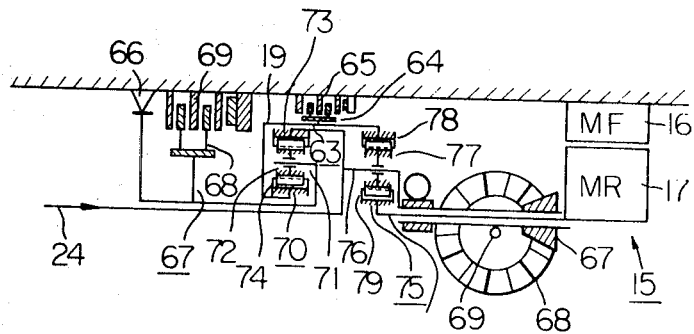
FIG. 14 is a partial schematic view of further embodiments of the system according to the present invention in which a hypoid gears are incorporated therewith disposed between the planetary gear sets and motor means.
Figure 22:
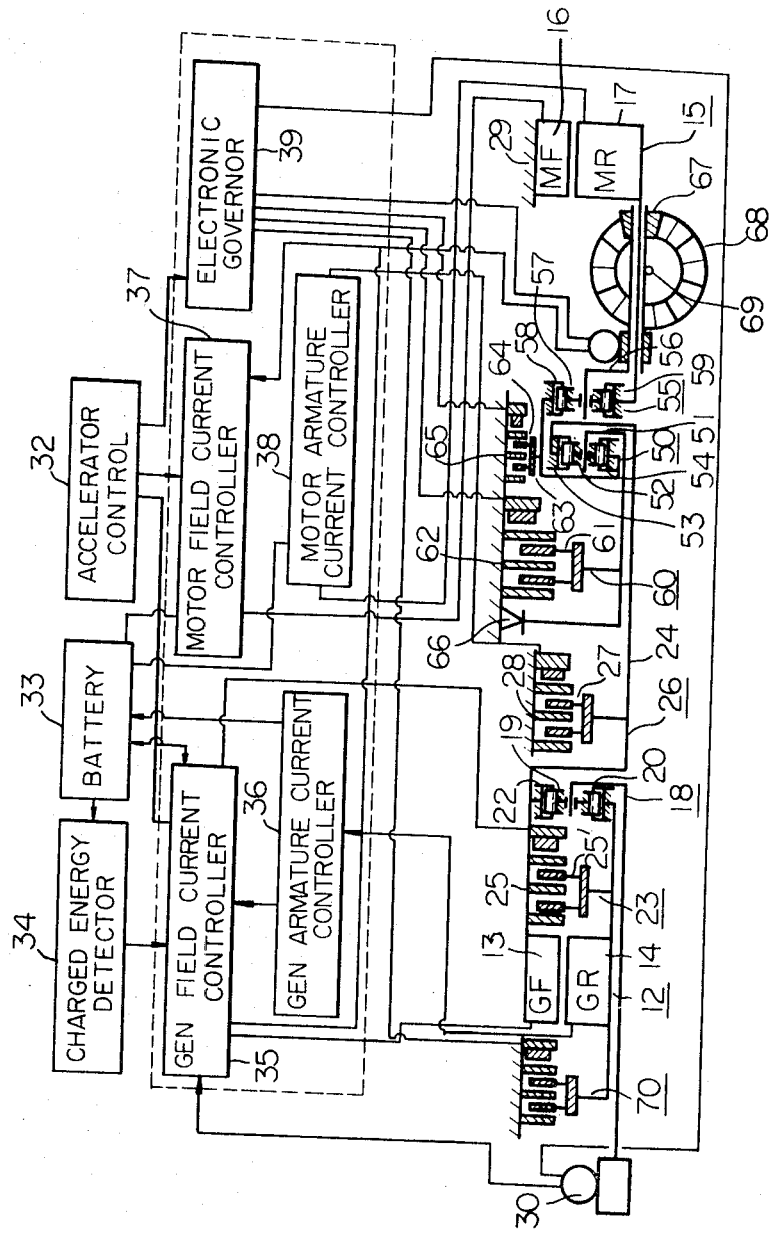
FIG. 22 is a view similar to FIG. 21, but a hypoid gears are accommodated with this system.

Referring now to FIG. 22, which shows still another modification of the system shown in FIG. 21, which comprises in addition thereto and hypoid gears 67, 68 are incorporated therewith disposed between the speed reduction gear and drive motor 15 the arrangement of which is similar to that shown in FIG. 14.

Figure 15:
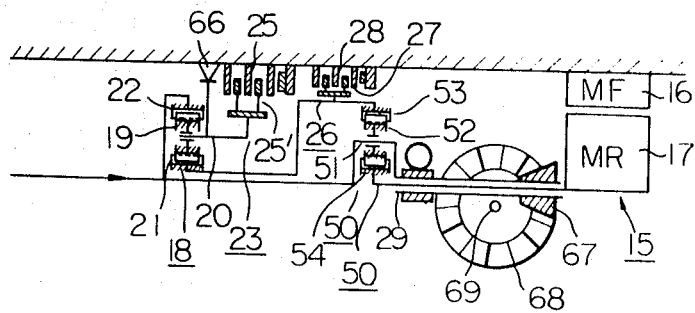
FIG. 15 is a view similar to FIG. 14, but the arrangement of the speed reduction gears is similar to that shown in FIG. 12.
Figure 16:
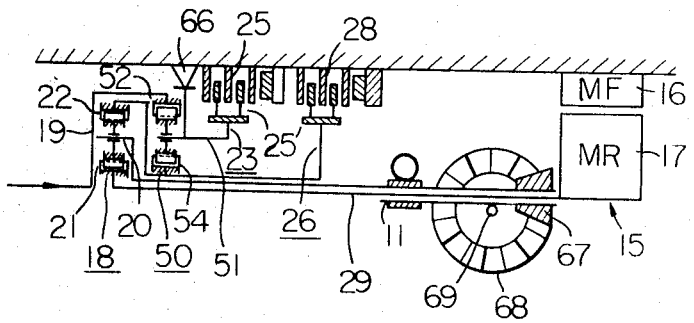
FIG. 16 is a view similar to FIG. 14, but the arrangement of the speed reduction gears is similar to that shown in FIG. 13.

This system may clearly be incorporated with the arrangement shown in FIGS. 15 and 16.

Figure 23:
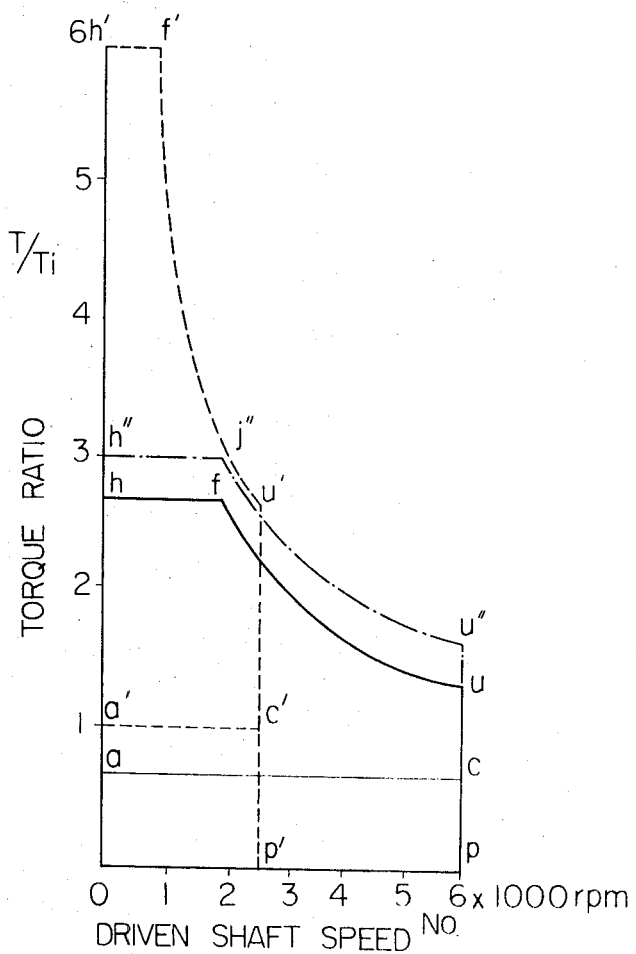
FIG. 23 is a graph of the relationship between the speed of the driven shaft and the torque ratio of the system incorporated wit the two speed reduction gear.

Referring now to FIG. 23, which shows a graph of the relationship shown in abscissa between the driven shaft speed $No$ and torque ratio $T/Ti$ in ordinate, the area shown by $o-h-f-a-p$ is high speed range for normal operation and that by $o-h'-f'-u'-p'$ low speed for starting and ascending, and that denoted by $-h-f-p$ overdrive range for highway running.

Referring to FIGS. 24A and 24B, which show schematic sectional and front views of an alternate of the planetary gear set designated by 88 without ring gear, respectively, which comprises carriers 89, first and second planet gears 90 and 91, and first and second sun gears 92 and 93.

This planetary gear set 88 operates similar to that of a normal planetary gear set. In this set, the first sun gear 92 engages with the first planet gears 90, extended second planet gear 91 meshed with the first planet gears 90 and also engaged in mesh with the second sun gear 93.

It is understood that this planetary gear set without ring gear is easy to work machining and may provide larger speed reduction ratio.

Referring to FIGS. 25A and 25B, which show schematic sectional and front views of another alternate of the planetary gear, which comprises in addition to those shown in FIGS. 24A and 24B third planet gears 94 axially engaged adjacent to the second planet gears 91 and a third sun gear 95 coaxially aligned in adjacent relation to the second sun gear 93 and engaged in mesh with the third sun gear 94.

Figure 26:
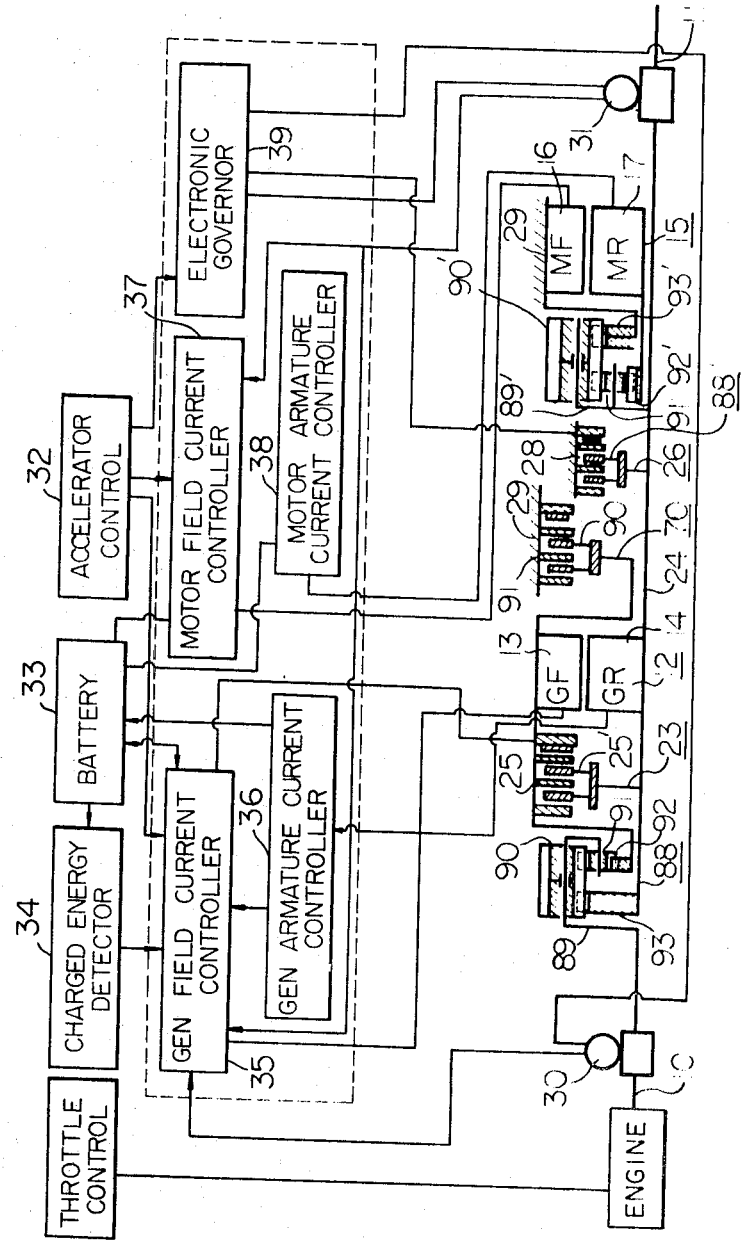
FIG. 26 is a diagrammatic view of still another embodiment of the system embodying this invention which the planetary gear sets having no ring gear are accommodated.

Referring now to FIG. 26, which shows still another embodiment of this invention using the planetary gear set without ring gear shown in FIG. 24, in which instead of the first and second planetary gear sets the first and second planetary gear sets without ring gear are used. This system comprises first planetary gear set 88 without ring gear including a first split carrier 89 connected with the drive shaft 10, a first planet gear 90 carried on the first split carrier 89, a first sun gear 92 meshed with the first planet gear 90 and also connected with the field 13 of the generator 12, and a second sun gear 93 meshed with the second planet gear 91 and also connected with the armature or rotor 14 of the generator 12; and a second planetary gear set 88' having no ring gear including a second split carrier 89' connnected with the driven shaft 11, a second planet gear 90' carried on the split carrier 89', a third sun gear 92' meshed with the third planet gear 91' and also connected with the armature 17 of the motor 15, a fourth sun gear 93' meshed with the fourth planet gear 90' and also connected with the body 29 of the vehicle.

In order to perform an overdrive operation in the previous system, it comprises a second clutch 70 for overdrive which includes a drive portion 102 connected with the field 13 of the generator and a driven portion 103 connected with the body 29 of the vehicle; and a third clutch 26 which acts for braking including a rotary portion 27 connected with the driven shaft 11 and a stationary portion 28 connected with the body 29 of the vehicle.

For the overdrive, the field 14 of the generator is engaged through the brake 70 with the body 29 of the vehicle so as to fix it with the result that the driven shaft 11 is overdriven.

Figure 27:
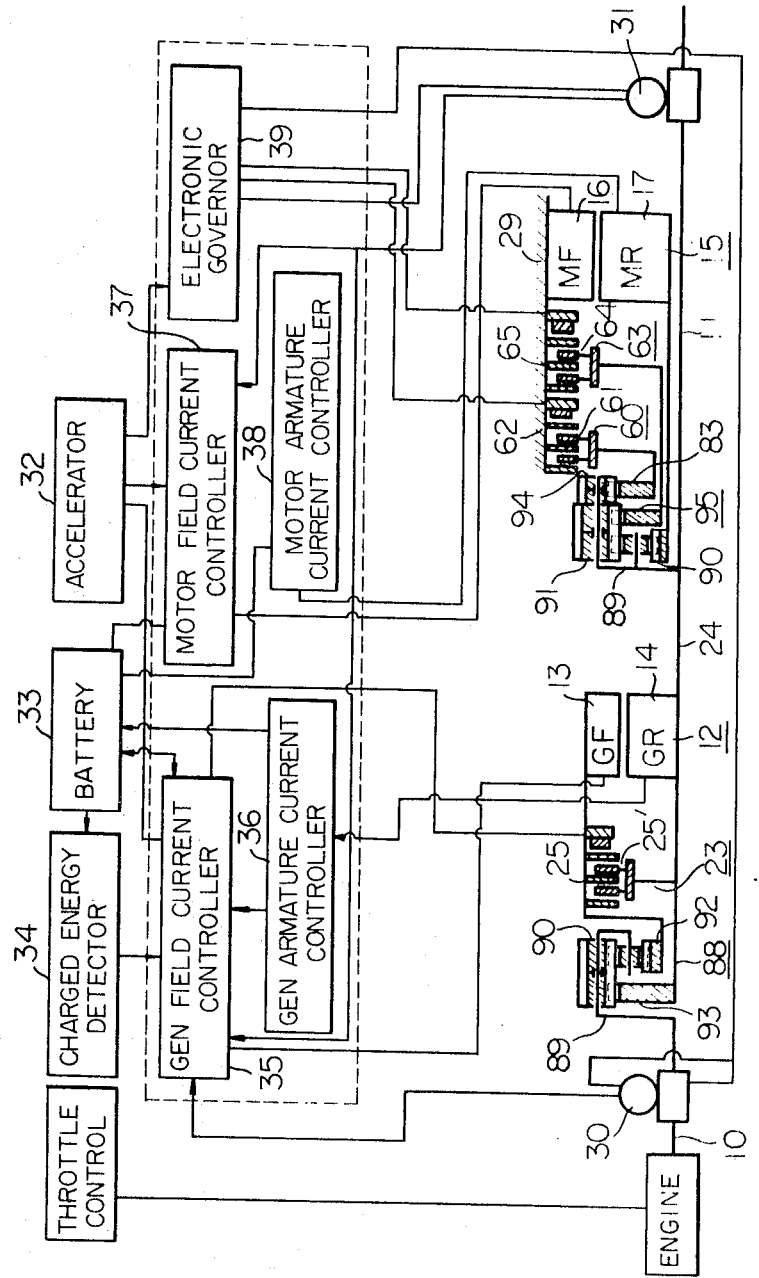
FIG. 27 is a view similar to FIG. 25, but the planetary gear set having no ring gear shown in FIGS. 25a and 25b is accommodated.

Referring now to FIG. 27, which shows still another embodiment of the present system having a planetary gear set having no ring gear shown in FIG. 25 instead of that shown in FIG. 24 in the system shown in FIG. 26, which planetary gear set having no ring gear includes a split carrier 89' connected with the driven shaft 11, a fourth and fifth planet gears 91 and 94 carried on the split carrier 89', a third sun gear 92 meshed with the second planet gear 91 and also connected wit the armature 17 of the motor 15, a fourth sun gear 93 meshed with the second planet gear 91 and also connected with the drive portion 61 of the brake 63, and a fifth sun gear 95 meshed with the fifth planet gear 94 integrally and coaxially connected in alignment with the fourth planet gear 91 and connected with the rotary portion 64 of the brake 60 for providing two-speed gear reduction.

Figure 28:
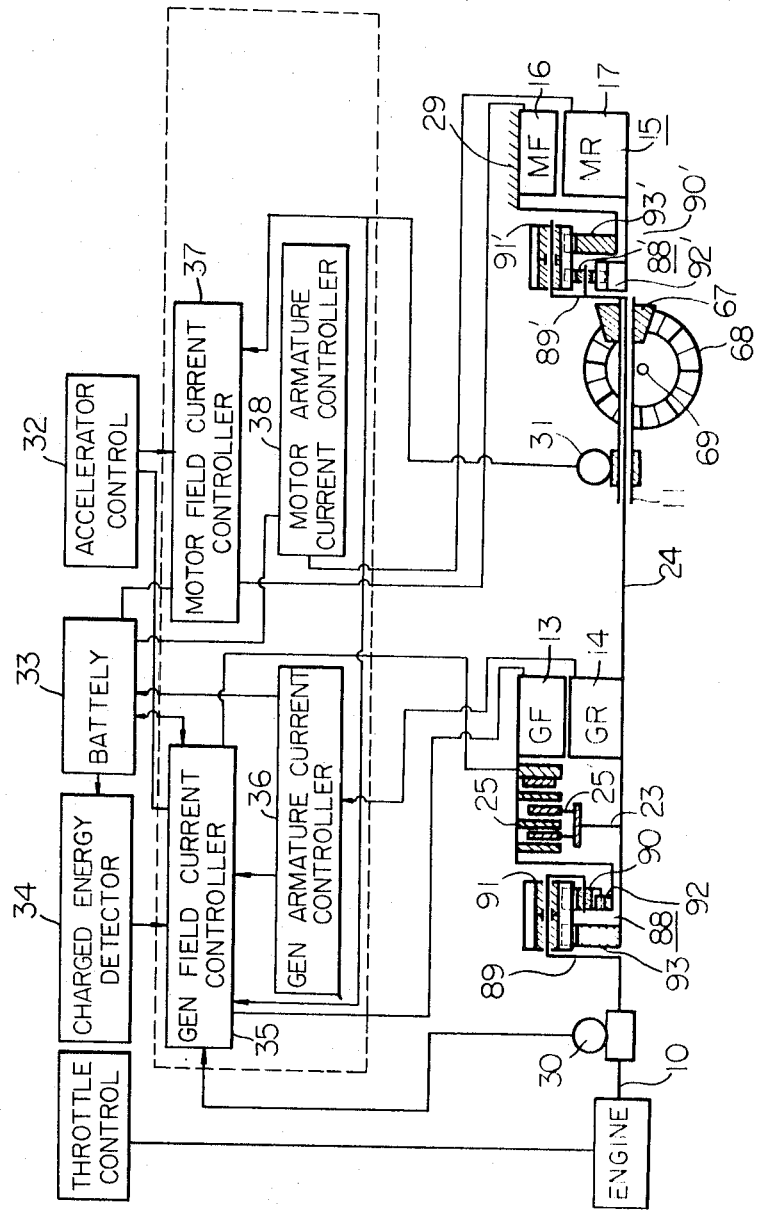
FIG. 28 is a view similar to FIG. 25, but the hypoid gears are incorporated.

Referring to FIG. 28, which shows another modification of the system shown in FIG. 26 having a hypoid gears, which comprises a hypoid pinion gear 67 connected with the carrier of the planetary gear set without ring gear and also with the armature 14 of the generator 12, a crown gear 68 meshed with the pinion gear 67 which is carried on a rear wheel axle 69.

THe operation of this system is similar to that shown in FIG. 26.

It will be understood that the first and second gear sets 88 and 88' having no ring gear may be replaced with that shown in FIG. 25.

It is clear that the driven shaft 11 may be overdriven in this system.

I claim:

1. An electromechanical power train system for a vehicle comprising a drive shaft driven by the engine; a driven shaft to drive said vehicle; a planetary gear set having a sun gear; a plurality of planet gears; a carrier rotatably supporting said planet gears, and a ring gear; a DC storage source; a generator electrically connected to said storage source, said generator having a field and armature; a motor electrically connected to said storage source, said motor having a field and armature; a friction clutch having a first and second rotary portions; and friction brake having a rotary and stationary portions; said sun gear of said planetary gear set being connected to said armature of said generator and said second rotary portion of said friction clutch; said drive shaft being connected to said carrier of said planetary gear set; said ring gear of said planetary gear set being connected to said field of said generator and said first rotary portion of said friction clutch and said armature of said motor; said armature being connected to said driven shaft; said field of said motor being fast on the body of the vehicle; said driven shaft being connected to said rotary portion of said friction brake; said stationary portion being fast relative to the body of the vehicle, said generator serving to control said planetary gear set by maintaining the rotation difference between said armature and field thereof when the engine torque is larger than the traveling resistance whereby the engine power delivered from the engine will develop at said driven shaft while said storage source is charged from said generator, said motor being actuated by the electric current supplied from said storage source for imparting an additional motor torque on said driven shaft when the engine torque is smaller than the travelling resistance, said friction brake being engaged for parking the vehicle, and said friction clutch being engaged for completing a direct drive through said planetary gear set.

* * * * *